US008593681B2

(12) United States Patent
Iguchi

(10) Patent No.: US 8,593,681 B2
(45) Date of Patent: Nov. 26, 2013

(54) IMAGE FORMING APPARATUS THAT DETERMINES WHETHER OR NOT A TOTAL TONER AMOUNT AND A DENSITY OF A COLOR TONER SATISFIES A PRINT CONDITION AND, IN A CASE WHERE THE TOTAL TONER AMOUNT HAS BEEN DETERMINED NOT TO SATISFY THE PRINT CONDITION, ADJUSTS THE TOTAL TONER AMOUNT SO AS TO SATISFY THE PRINT CONDITION, IMAGE FORMING METHOD THEREFOR, AND STORAGE MEDIUM INCLUDING THE SAME

(75) Inventor: Shunsuke Iguchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1014 days.

(21) Appl. No.: 12/369,981

(22) Filed: Feb. 12, 2009

(65) Prior Publication Data

US 2009/0201522 A1 Aug. 13, 2009

(30) Foreign Application Priority Data

Feb. 12, 2008 (JP) ................................ 2008-030062

(51) Int. Cl.
*H04N 1/60* (2006.01)
(52) U.S. Cl.
USPC .......... 358/1.9; 358/1.18; 358/3.21; 358/448; 358/501; 358/537; 358/450; 358/540
(58) Field of Classification Search
None
See application file for complete search history.

(56) References Cited

U.S. PATENT DOCUMENTS

| 6,535,712 | B2 * | 3/2003 | Richards | 399/341 |
|---|---|---|---|---|
| 7,113,718 | B2 * | 9/2006 | Bobo et al. | 399/67 |
| 7,139,521 | B2 * | 11/2006 | Ng et al. | 399/341 |
| 7,178,898 | B2 * | 2/2007 | Hoshino | 347/40 |
| 7,236,734 | B2 * | 6/2007 | Ng et al. | 399/341 |
| 7,340,190 | B2 * | 3/2008 | Toyohara et al. | 399/45 |
| 7,533,982 | B2 * | 5/2009 | Yoneyama | 347/102 |
| 7,682,015 | B2 * | 3/2010 | Hoshino | 347/102 |
| 7,783,242 | B2 * | 8/2010 | Chigono et al. | 399/341 |
| 7,877,053 | B2 * | 1/2011 | Ng et al. | 399/341 |
| 8,086,124 | B2 * | 12/2011 | Zaima | 399/53 |
| 8,400,674 | B2 * | 3/2013 | Igarashi | 358/1.9 |
| 8,456,681 | B2 * | 6/2013 | Suzuki | 358/1.15 |
| 8,478,031 | B2 * | 7/2013 | Kaneko | 382/162 |

(Continued)

FOREIGN PATENT DOCUMENTS

JP 2007-199209 A 8/2007

OTHER PUBLICATIONS

Jim Meehan, Ed Taft, Stephen Chernicoff, Caroline Rose, and Ron Karr, et al., PDF Reference, fifth edition, Adobe® Portable Document Format, Version 1.6, Year 2004, pp. 483-545 and Plates 16-20, Adobe® Systems Incorporated, USA, (ISBN: 0-321-30474-8).

*Primary Examiner* — Dung Tran
(74) *Attorney, Agent, or Firm* — Canon U.S.A., Inc., IP Division

(57) ABSTRACT

An image forming apparatus that forms a color image using a transparent toner and color toners based on received printing information includes a determination unit configured to determine whether a transparency attribute is set for an object included in the printing information, and a generation unit configured to generate a transparent object using the transparent toner on the object when the determination unit determines that the transparency attribute is set for the object.

9 Claims, 10 Drawing Sheets

(56) References Cited

U.S. PATENT DOCUMENTS

| | | | |
|---|---|---|---|
| 2003/0218656 A1* | 11/2003 | Yamazaki et al. | 347/43 |
| 2005/0219569 A1* | 10/2005 | Yamamoto et al. | 358/1.9 |
| 2007/0071474 A1* | 3/2007 | Watanabe et al. | 399/67 |
| 2007/0171444 A1* | 7/2007 | Washino | 358/1.9 |
| 2007/0172260 A1 | 7/2007 | Fukuda | |
| 2007/0211100 A1* | 9/2007 | Mizutani et al. | 347/19 |

* cited by examiner

IMAGE FORMING APPARATUS THAT DETERMINES WHETHER OR NOT A TOTAL TONER AMOUNT AND A DENSITY OF A COLOR TONER SATISFIES A PRINT CONDITION AND, IN A CASE WHERE THE TOTAL TONER AMOUNT HAS BEEN DETERMINED NOT TO SATISFY THE PRINT CONDITION, ADJUSTS THE TOTAL TONER AMOUNT SO AS TO SATISFY THE PRINT CONDITION, IMAGE FORMING METHOD THEREFOR, AND STORAGE MEDIUM INCLUDING THE SAME

BACKGROUND OF THE INVENTION

1. Field of the Invention

The present invention relates to image forming apparatuses and image forming methods that use transparent toner.

2. Description of the Related Art

Recently, image forming apparatuses using a transparent glossy medium as a toner have been practically realized (Japanese Patent Application Laid-Open No. 2007-199209). For example, by using a transparent toner over the whole surface of a printed product, gloss can be improved and a coating (protective) effect can be obtained.

Further, by applying a transparent toner to a specific character or the shape of a graphic, a printed product which better reflects a user's intentions can be generated.

On the other hand, page description languages (PDLs) that can give a transparent effect to an object exist.

For example, in Adobe's PDF format (PDF Reference, 5th Edition, Version 1.6, Adobe Systems Incorporated, ISBN: 0-321-30474-8), a transparent effect is imparted between a background object and a transparent object, so that an object given a transparent effect can be displayed on a display and printed.

Now, the types and characteristics of transparent films, such as colored transparent cellophane and plastic shopping bags, will be discussed.

In these substances, as the transmittance becomes higher, the glossiness becomes higher. On the contrary, as the transmittance becomes lower, the glossiness becomes lower.

FIG. 10 is a schematic diagram illustrating a situation where an object is observed via a transparent substance.

In FIG. 10, incident light 103 is diffusely reflected at the surface of the transparent substance 101 in proportion to the smoothness (flatness) of the surface, whereby the transmittance decreases.

That portion of the incident light 103 which is not diffusely reflected at the surface of the transparent substance 101 passes through the transparent substance 101, and is incident on a white object 102. This light is reflected by the white object 102, passes through the transparent substance 101, and is then incident on an observer 104. The transparent substance 101 absorbs a portion of the light that passes through it 101. As a result of such absorption and diffuse reflection, the white object 102 is perceived by the observer 104 as being a dusky red color.

However, an image forming apparatus which can simulate such a transparent substance has heretofore not been achieved.

Here, the case in which the transparent effect in current PDLs is printed on a paper surface using electrophotographic technology is considered.

In current PDLs, an object having the transparent effect and a transparent toner are not associated.

Therefore, printing is performed on the printed product using the process color toners, such as cyan, magenta, yellow, and black (CMYK), even if the object has a transparent effect.

Accordingly, there is a problem that regardless of whether each object has a transparent effect or not, the gloss on all of the objects is similar.

Further, to apply a transparent toner for expressing glossiness on a designated region, the user of the PDL must intentionally designate application of the transparent toner on objects which have a transparent effect.

That is, for example, a plate called a spot color plate, which is separate from the process colors, has to be prepared, and the objects on which the transparent toner is to be applied have to be designated on that plate.

In an image model based on RGB color space, for example, such as GDI+ in Microsoft's Windows®, spot colors other than the process colors cannot be handled.

Therefore, in order for the PDL user to apply a transparent toner, separate PDL data has to be generated using a different technique, such as form overlay. Further, to apply the transparent toner on a form overlay, substantial changes have to be made to image forming apparatuses, printer drivers, and applications, respectively. Further, the operations carried out by a user are complex.

In an image model based on CMYK color space, such as Adobe's PDF format, a spot color plate can be handled.

By applying a transparent toner to this spot color, it is much easier to designate the transparent toner than in the RGB image model.

FIGS. 11A and 11B are schematic diagrams illustrating image processing in a conventional image forming apparatus. The problems in a PDL having a spot color plate will now be described with reference to these drawings.

In FIG. 11A, in the PDL, a colorless transparent object 201 overlaps a background, non-transparent object 202.

However, in image formation performed using a conventional PDL, generally, when objects overlap, based on an assumption that all of the objects are non-transparent, the object in the background is blocked out, which is called "knocked out".

Therefore, unless overprinting is intentionally designated for the object 201, the object 202 in the background of the spot color plate is blocked out by the object 201, so that the background object 202 is deformed like object 203. As a result, as illustrated in FIG. 11B, there is a problem that the printing result is different from the shape intended by the user.

In color image forming apparatuses using electrophotographic technology, an image is formed using toners.

Thus, for example, if the respective CMYK process colors all have a 100% density and are arranged overlapping each other at the same location, problems arise such as insufficient fixing of the toners and toner scattering, and this can even lead to the image forming apparatus being damaged.

To prevent this, a toner density adjustment is generally performed, in which the toner total amount which can be printed overlapping at the same location is restricted.

FIG. 12 is a schematic diagram illustrating the toner density adjustment processing in a conventional color image forming apparatus.

FIG. 12 illustrates an object 301, which may be the number zero, for example, drawn in green (C=100%, Y=100%) with a 100% coating applied around the outline by a transparent toner.

An image portion 302 schematically illustrates a state where toner is applied at the locations illustrated by the dashed line. Since the image portion 302 is applied with transparent toner at a 100% density over the C=Y=100%, the toner total amount is 300%.

Thus, if the image portion corresponding to the object is thermally fixed onto the paper surface by the image forming apparatus by electrophotography, like the image portion 303, the toner may break up and scatter, which can lead to insufficient fixing and damage the apparatus.

To prevent this, in the toner density adjustment, for example, the upper limit of the toner total amount is limited to 150% for a total input of 200% of green C=Y=100%. As a result, generally, by reducing each of the channels in an equal ratio, such as C=Y=75%, the toner total amount is reduced without causing a change in color.

FIG. 13 is a schematic diagram illustrating the printing results when a toner density adjustment is performed based only on the densities of the channels corresponding to the respective colors in the image forming apparatus.

In FIG. 13, the colored objects 402 and 403 are objects having colors of respectively C=M=90% and C=Y=90%.

Now, assume that a 100% density transparent toner object 401 is overlapped thereon. When the toner density adjustment is performed on such printing data based only on the densities of each channel, only the overlapping portion 404 of the transparent toner 401 and the colored object 403 is subjected to a toner reduction. As a result, the portions in which the transparent toner does not overlap are printed without color modification.

Similarly, only the overlapping portion 405 of the transparent toner 401 and the colored object 402 corresponding to a normal object is subjected to a toner reduction. As a result, the portions in which the transparent toner does not overlap are printed without color modification.

When a transparent toner is used for protection in electrophotographic technology, even if an attempt is made to print objects having different toners by exactly aligning them, due to inaccuracies in the printing apparatus, the printing cannot always be performed with the objects correctly aligned (color misregistration).

FIGS. 14A and 14B are diagrams illustrating the color misregistration, which occurs when a non-transparent toner and a transparent toner are overlapped in an image forming apparatus.

In FIG. 14A, when a non-transparent toner object 502 and a transparent toner object 501 having exactly the same shape are printed, color misregistration occurs with the misregistration amount 503.

Conventionally, trapping has been used as a technique for preventing color misregistration.

As illustrated in FIG. 14B, trapping involves the following processing so that gaps between adjacent non-transparent objects cannot be seen.

More specifically, one of the objects is enlarged (in FIG. 14B, as illustrated by the arrow, the object on the right side is enlarged) and covers a part of the other object so that the gap is not noticeable. As a result, the same-shaped objects can be misaligned, and thus trapping is not an effective technique for situations where the protective effect is lost.

SUMMARY OF THE INVENTION

According to one aspect of the present invention, an image forming apparatus generates a transparent object using a transparent toner based on a transparency attribute which is included in received printing information.

According to another aspect of the present invention, an image forming apparatus suppresses overall toner density, including respective color toners and a transparent toner, when forming a color image using a transparent toner based on a transparency attribute included in received printing information.

According to another aspect of the present invention, an image forming apparatus improves color misregistration, which may occur when forming a color image using a transparent toner, based on a transparency attribute included in received printing information.

According to another aspect of the present invention, an image forming apparatus, which forms a color image using a transparent toner and color toners based on received printing information, includes a determination unit configured to determine whether a transparency attribute is set for an object included in the printing information, and a generation unit configured to generate a transparent object using the transparent toner on the object when the determination unit determines that the transparency attribute is set for the object.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DETAILED DESCRIPTION OF THE EMBODIMENTS

Various exemplary embodiments, features, and aspects of the invention will be described in detail below with reference to the drawings.

Figure 1A:
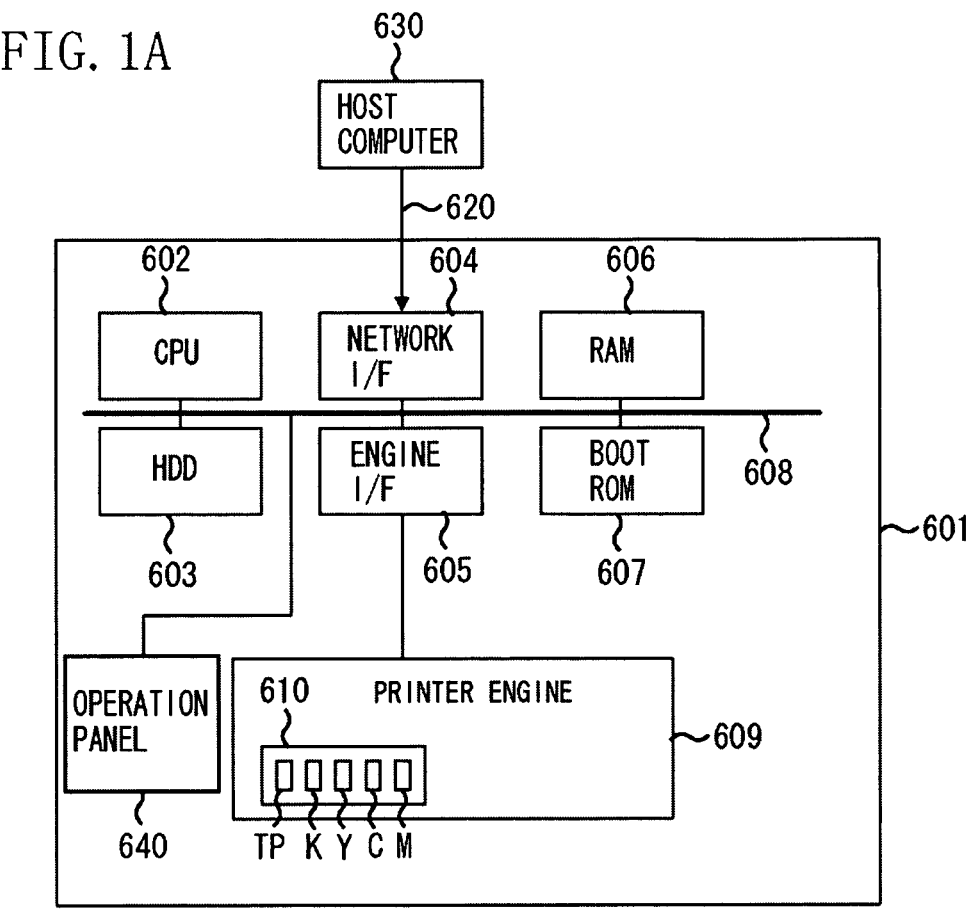
FIG. 1A is a block diagram illustrating an example of an image processing system including an image forming apparatus according to exemplary embodiments of the present invention.

FIG. 1A is a block diagram illustrating an example of an image processing system including an image forming apparatus according to the exemplary embodiments of the present invention. While an example of a printer is illustrated here as an image forming apparatus, this system can be configured by a multifunction peripheral (MFP), which includes a scanner apparatus. This example is configured so that images are formed using a transparent toner TP in addition to the respective color toners CMYK. The image forming apparatus will now be described with a printer as an example.

In FIG. 1A, a printer 601 receives printing information 620 by communicating with a host computer 630 via a network interface (I/F) 604. Here, the printing information 620 is generated via a printer driver installed in the host computer 630. As described below, the printer driver includes a user interface for designating the transmittance, and is configured so that the transmittance can be designated by a user's operation.

Here, the transmittance (this is designated as the transmittance a in detail described below) is information for determining the level of transparency of the transparent toner (TP), which is independently provided from the color toners (CMYK) provided in a toner unit 610 in a printer engine 609. The transmittance is designated by PDL data as a transparency attribute.

Further, the printing information 620 is based on a predetermined page description language. The printing information is configured including text, images, graphics and the like as a plurality of objects per page unit.

A central processing unit (CPU) 602 is connected to a system bus 608. The CPU 602 controls each of the peripheral apparatuses connected to the system bus 608, and calculation and execution of the programs stored in the storage device. The CPU 602 performs image forming processing corresponding to the normal objects which use the color toners corresponding to CMYK, and to the transparent objects using a transparent toner, from among the printing information received from the host computer 630. In this case, the CPU 602 includes a function for analyzing the transparency attribute designated by the printer driver installed in the host computer 630.

A random access memory (RAM) 606 and a hard disk drive (HDD) 603 are storage devices. A boot read only memory (ROM) 607 stores startup processing. A printer engine I/F 605 communicates and controls with the printer engine 609. The printer engine 609 is an apparatus that reproduces a digital image on the surface of physical paper using electrophotography technology, for example. The printer 601 includes these respective devices.

Figure 1B:
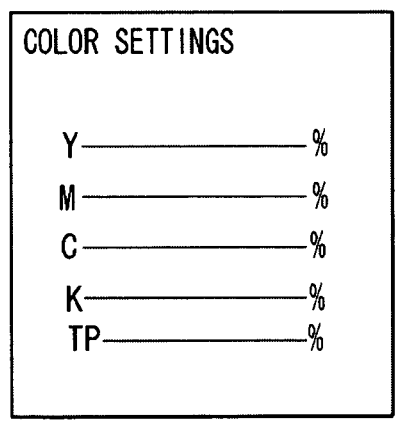
FIG. 1B is a diagram illustrating an example of a user interface displayed on a display apparatus of a host computer illustrated in FIG. 1A.

FIG. 1B is a diagram illustrating an example of a user interface displayed on a display apparatus of the host computer 630 illustrated in FIG. 1A. This user interface is displayed when a user has requested a color setting on a printer driver installed in the host computer 630. The mode of this user interface is not limited to that described in this example, so long as the transmittance for the transparent toner can be designated. Further, the transmittance with the transparent toner is set in the PDL data as an a value in the transparency attribute by the printer driver corresponding to the printer 601, which is installed in the host computer 630. Further, this user interface can be displayed subordinately by selections in the settings of the printer driver, or can be displayed by setting in an independent tab sheet.

Figure 2:
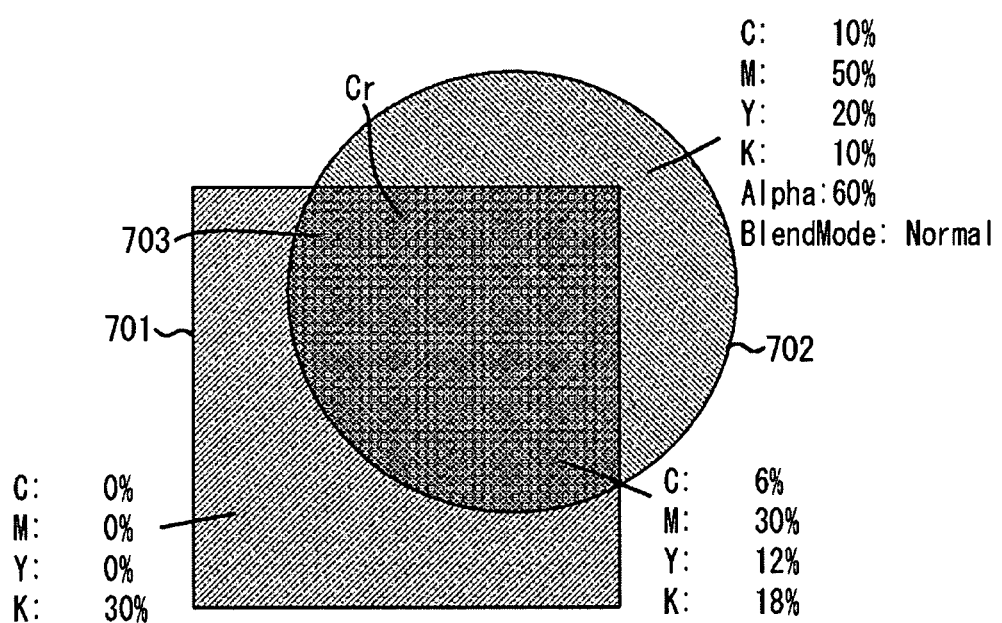
FIG. 2 is a schematic diagram for illustrating a transparent effect of an image formed by a printer illustrated in FIG. 1A.

FIG. 2 is a schematic diagram illustrating a transparent effect of an image formed by the printer 601 illustrated in FIG. 1A. Here, to simplify the description, a case will be described which includes a background object 701 and a transparent object 702, in which a transparency attribute is set and which is arranged as a foreground.

In FIG. 2, the image includes the background object 701, the transparent object 702, and an overlapping portion 703 thereof. Further, all of the colors are defined in CMYK color space. For example, the background object 701 is a monochrome K object having a density of 30%, and the transparent object 702 is a dark pink object having densities of C=10%, M=50%, Y=20%, and K=10%.

When a color resulting from a certain pixel in the overlapping portion 703 is given as Cr, the transparent effect is computed by the following calculation formula (1).

$$Cr = (1-\alpha s/\alpha r) \times Cb + \alpha s/\alpha r \times \{(1-\alpha b) \times Cs + \alpha b \times B(Cb, Cs)\} \quad (1)$$

where Cb denotes the color of the background object, Cs denotes the color of the (foreground) transparent object, αr denotes the transmittance in the resultant image, αb denotes the transmittance of the background object, αs denotes the transmittance of the transparent object, and B(Cb, Cs) denotes a blend function.

The blend function is a function for defining the visual effect of the transparent portion. Modes such as normal, multiply, screen, and overlay are defined.

Normal mode is defined as B(Cb, Cs)=Cs. An arithmetic calculation between the Cb and Cs is performed in other modes. Here, if the blend function mode is normal, and αr=100% (non-transparent), the above formula (1) can be simplified as Cr=(1−αs)×Cb+αs×Cs. For example, if 60% transmittance (αs=0.6) is applied to the transparent object 702, and to each of the CMYK channels, the overlapping portion 703 is calculated by the CPU 602 as follows:

$$C = 0.4 \times 0\% + 0.6 \times 10\% = 6\%$$

$$M = 0.4 \times 0\% + 0.6 \times 50\% = 30\%$$

$$Y = 0.4 \times 0\% + 0.6 \times 20\% = 12\%$$

$$K = 0.4 \times 30\% + 0.6 \times 10\% = 18\%$$

Further, even the portion of the transparent object 702 which does not overlap with the background object 701 is subjected to transparent processing on the white of the back ground. Therefore, the respective colors have 60% of the original density for each of the channels, as follows:

$$C=0.6\times10\%=6\%$$

$$M=0.6\times50\%=30\%$$

$$Y=0.6\times20\%=12\%$$

$$K=0.6\times10\%=6\%$$

Figure 3:
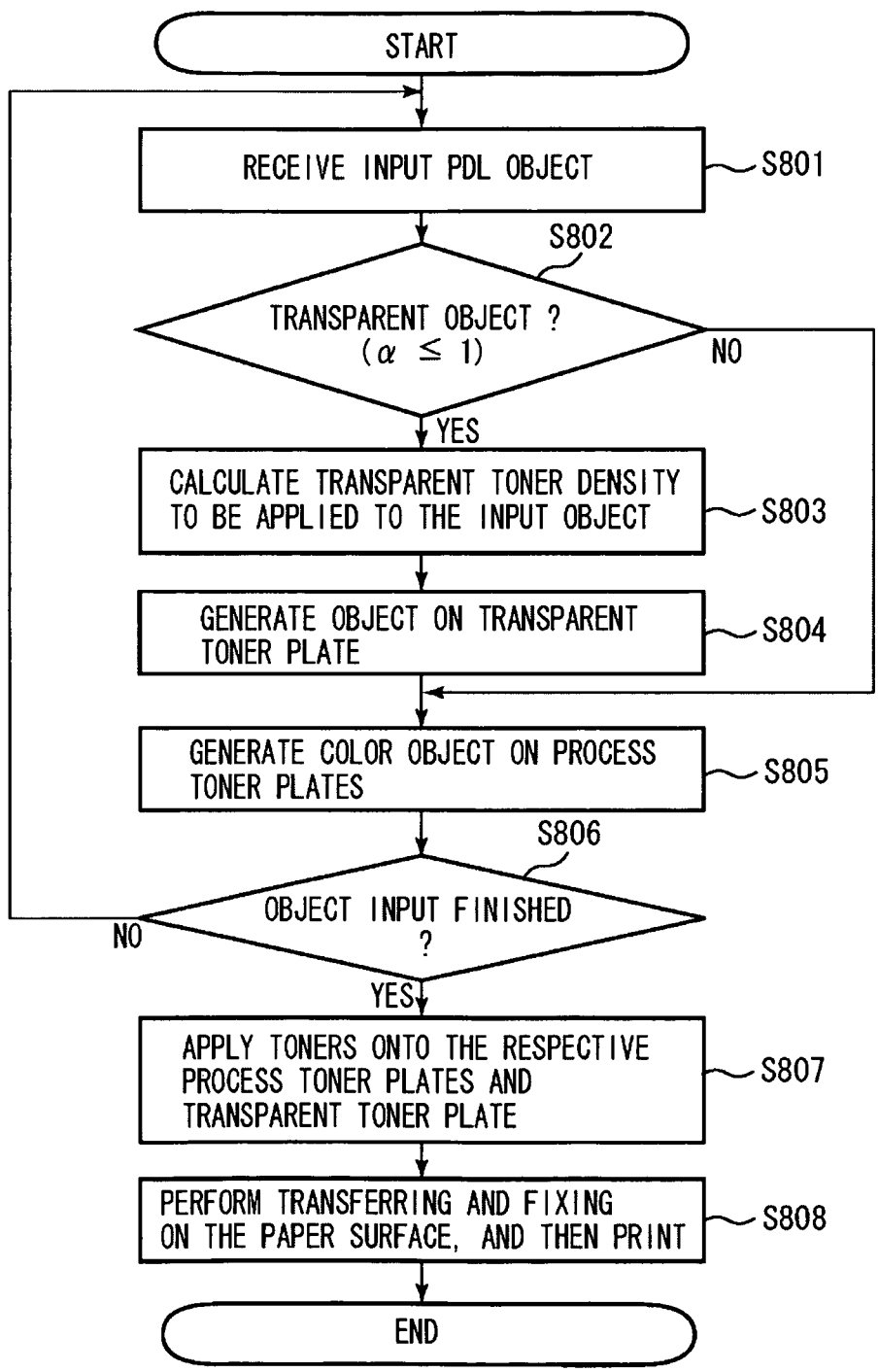
FIG. 3 is a flowchart illustrating an example of the data processing procedure in the image forming apparatus according to the exemplary embodiments of the present invention.

FIG. 3 is a flowchart illustrating an example of the data processing procedure in the image forming apparatus according to the exemplary embodiments of the present invention. This is an example of object processing of a transparent toner TP in an image forming apparatus. Each step is realized by the CPU 602 loading a control program stored in the ROM 607 into the RAM 606 and executing the control program. Further, in the present exemplary embodiment, the CPU 602 receives printing information including a PDL object from the host computer 630 via the network interface 604, and stores the printing information in the RAM 606.

Once the processing is started, in step S801, a PDL object from among the received printing information is input. Then, in step S802, the CPU 602 determines whether the input PDL object is an object having a transparency attribute. Specifically, the CPU 602 checks the α value in the transparency attribute, for example, and if that value is less than or equal to 1, determines that the input object is a transparent object.

Here, if the CPU 602 determines that the input object is a transparent object (YES in step S802), the processing proceeds to step S803, and the CPU 602 computes the transparent toner density to be applied to the input object.

Figure 4:
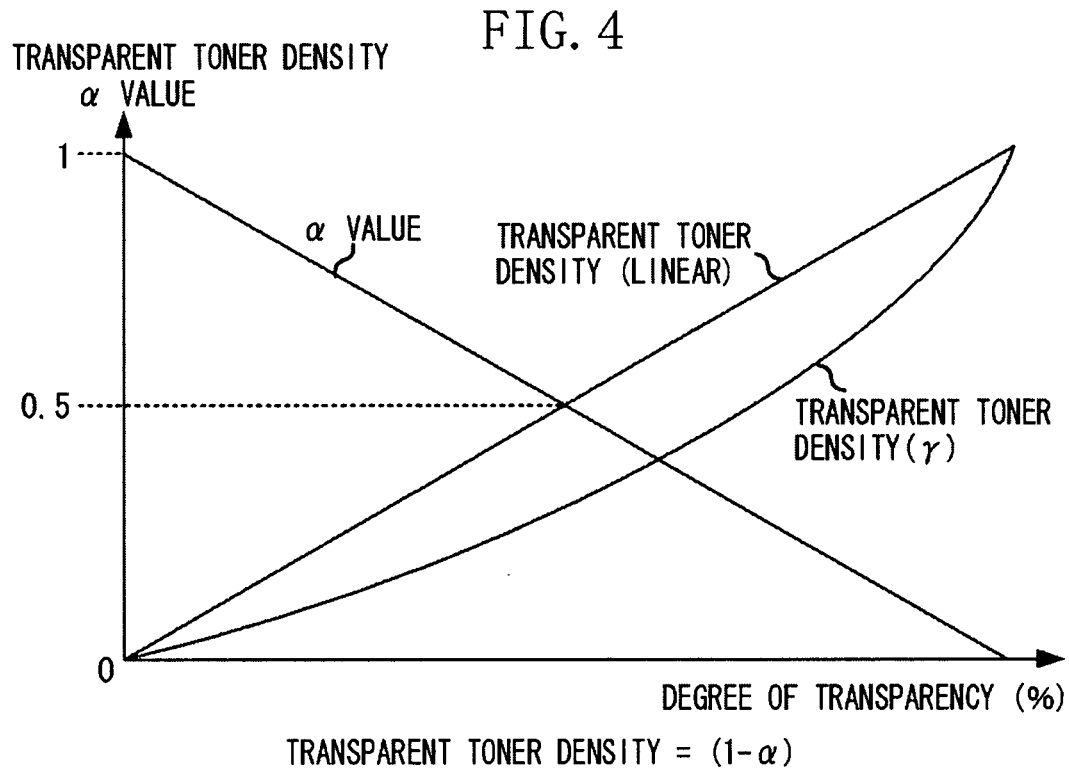
FIG. 4 is a characteristics chart illustrating the application method of a transparent toner density in the image forming apparatus according to the exemplary embodiments of the present invention.

FIG. 4 is a characteristics chart illustrating the application method of the transparent toner density in the image forming apparatus according to the exemplary embodiments of the present invention.

In FIG. 4, the vertical axis represents the transparent toner density and the α value, and the horizontal axis represents the transmittance (degree of transparency). Here, the transmittance is defined so that a higher value indicates the higher transparency, while the α value is defined having inverse proportion to transparency, that is, when transparency is higher, the α value is lower.

In step S803, a value that has linear inverse proportion to the α value is applied as the transparent toner density to the object having such an α value. Namely, the CPU 602 calculates transparent toner density=$(1-\alpha)$.

For example, the CPU 602 performs a calculation so that if the α value is "1", the transparent toner density is 0%, if the α value is 0.5, the transparent toner density is 50%, and if the α value is 0.2, the transparent toner density is 80%.

Next, in step S804, the CPU 602 generates a transparent object on the transparent toner plate using the above-described transparent toner density. In step S805, like in a conventional image forming apparatus, the CPU 602 generates a color separated object on each of the plates of the colors corresponding to CMYK for the input object.

On the other hand, in step S802, if the CPU 602 determines that the input object is not a transparent object (NO in step S802), steps S803 and S804 are skipped.

Next, in step S806, the CPU 602 determines whether the input object is the last object to be input for that page. If the CPU 602 determines that the input object is not the last object (NO in step S806), the processing returns to step S801. The CPU 602, if receives a new input object, then continues the processing of steps S802 to S805.

If the CPU 602 determines in step S806 that the input object is the last object (YES in step S806), the processing proceeds to step S807. In step S807, the CPU 602 controls the printer engine 609 so as to apply the respective corresponding toners onto the CMYK process toner plates and the transparent toner plate generated in steps S804 and S805.

In step S808, the CPU 602 performs printing by transferring the respective color toners CMYK and the transparent toner TP of the printer engine 609 onto a recording paper surface and fixing the toners onto the recording paper with a fixing unit (not illustrated), and then finishes the present processing.

By controlling the image forming apparatus in this manner, like a real transparent substance, a phenomenon in which smoothness changes according to the transmittance can be pseudo-reproduced using a transparent toner. Further, by performing this processing automatically, a user can apply the transparent toner without being aware of the transparent object.

In addition, even for PDL data, which does not have a spot color, by designating the transparency attribute by the printer driver, the transparent toner application object can be designated using an existing transparency attribute.

Further, even for PDL data, which has a spot color, an advantageous effect is obtained in which the transparent toner application object can be designated without worrying about an overprint designation.

In the above exemplary embodiment, an example has been described in which a value having linear inverse proportion to the α value is applied as the transparent toner density.

However, in printing using a non-transparent toner, the non-transparent toner density and the density of the halftone color actually perceived by a human are known not to match.

This is because human perception is not linear, because humans have a non-linear sensitivity. In order to adjust the non-linear perception of humans, gamma correction, which applies a power function to the input value, is usually performed.

Further, since the transparent toner density and the density of the halftone gloss actually perceived by a human also do not match, in the present exemplary embodiment, like to the non-transparent toner, an example to which a γ curve is applied will be described.

In step S803 illustrated in FIG. 3, if the γ value is "1.2", $$\text{transparent toner density}=(1-\alpha)^{\wedge}1.2,$$

where the symbol "^" represents a power function. E.g., 2^3=2 raised to the third power=8.

For example, the CPU 602 performs a calculation so that if the α value is "1", the transparent toner density is 0%, if the α value is "0.5", the transparent toner density is 43.5%, and if the α value is "0.2", the transparent toner density is 76.5%.

By thus applying the transparent toner density, in addition to the effects described in the above exemplary embodiment, an advantageous effect is obtained in which glossiness closer to that perceived by humans can be obtained even for halftones.

In the above exemplary embodiment, an example has been described, in which a value having linear inverse proportion to the α value is applied as the transparent toner density.

In the present exemplary embodiment, printing is performed with little or no change to a user's design, while limiting the toner total amount.

Figure 5:
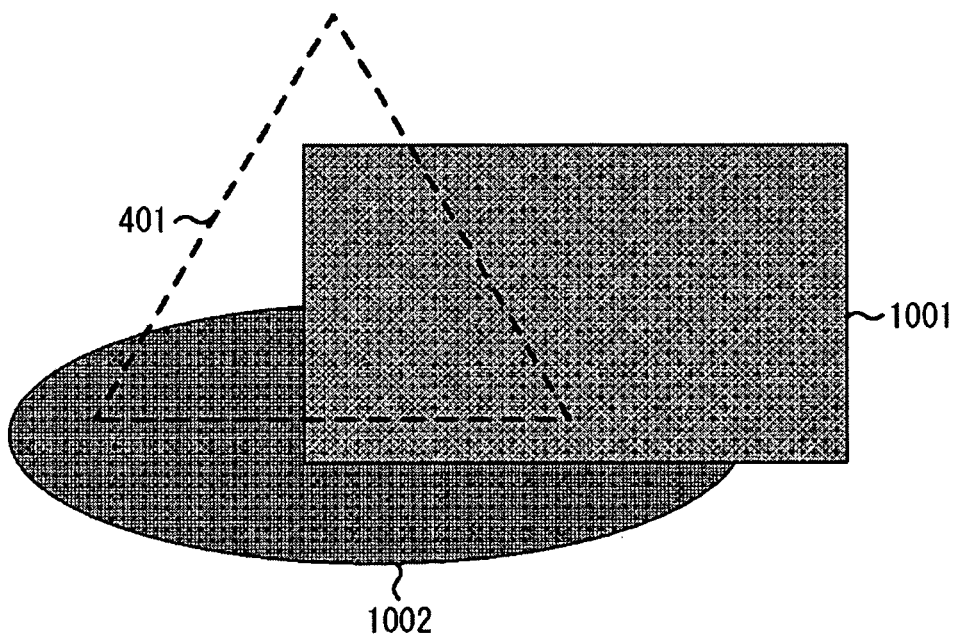
FIG. 5 is a diagram illustrating toner density adjustment in the image forming apparatus according to the exemplary embodiments of the present invention.

FIG. 5 is a schematic diagram illustrating an example of toner density adjustment in the image forming apparatus according to the exemplary embodiments of the present invention.

Figure 6:
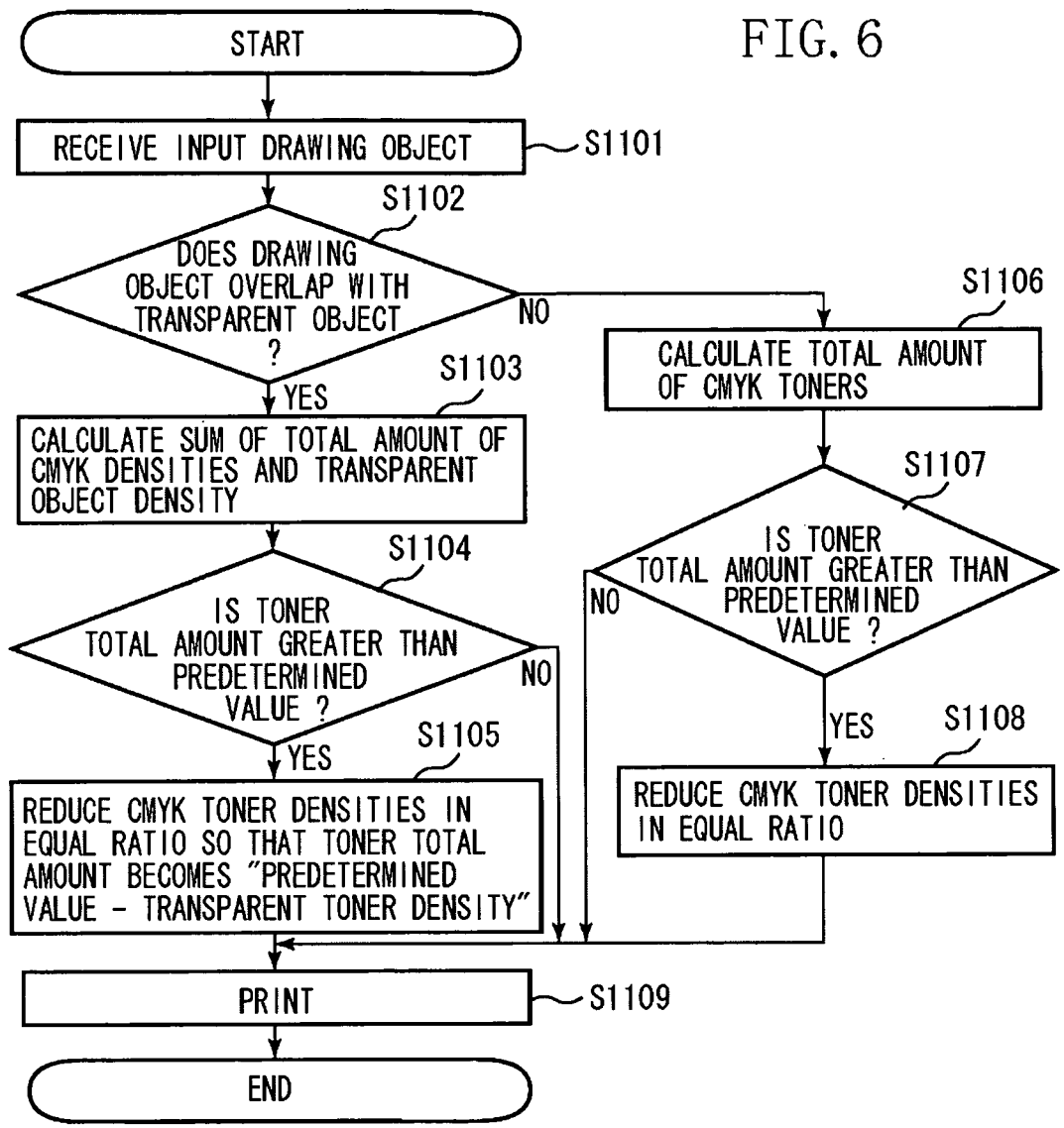
FIG. 6 is a flowchart illustrating an example of the data processing procedure in the image forming apparatus according to the exemplary embodiments of the present invention.

As illustrated in FIG. 5, if the CPU 602 determines that an object 401 represented by the transparent toner TP even slightly overlaps certain objects 1002 and 1001, the CPU 602 performs processing in the procedure illustrated in FIG. 6 to uniformly reduce the toner density of such objects.

FIG. 6 is a flowchart illustrating an example of the data processing procedure in the image forming apparatus according to the exemplary embodiments of the present invention. That is, an example of toner density adjustment processing. The CPU 602 realizes each step by loading a control program, which is stored in the ROM 607, into the RAM 606 and by executing the control program. Further, in the present exemplary embodiment, the CPU 602 receives printing information including a PDL object from the host computer 630 via the network interface 604, and stores the printing information in the RAM 606.

First, in step S1101, the CPU 602 inputs the displayed drawing object into the RAM 606. Next, in step S1102, the CPU 602 determines whether an object to be reproduced by a transparent toner exists, and whether the input drawing object even partially overlaps therewith in a perpendicular direction on the recording paper surface, which is supplied to the printer engine 609.

If the CPU 602 determines that the drawing object overlaps with the transparent object (YES in step S1102), then in step S1103, the CPU 602 calculates the sum of the total amount of CMYK densities of the input drawing object and the transparent object density.

Next, in step S1104, the CPU 602 determines whether the total amount of the toners calculated in step S1103 is greater than a predetermined value of the maximum toner total amount which is allowed to be input by the image forming apparatus.

Then, if the CPU 602 determines that the toner total amount is equal to or less than the predetermined value (NO in step S1104), namely, that the density can be processed by the image forming apparatus, the processing proceeds to step S1109. Then, in step S1109, the CPU 602 proceeds to normal printing and performs printing without adjusting the toner density, and then finishes the present processing.

On the other hand, if the CPU 602 determines that the toner total amount exceeds the predetermined value (YES in step S1104), the processing proceeds to step S1105. Then, in step S1105, the CPU 602 reduces the CMYK colored toner densities in an equal ratio so that the total amount of the CMYK colored toners is equal to or less than a value obtained by subtracting the transparent toner density of the above-described transparent toner object from the toner total amount predetermined value.

Next, in step S1109, the CPU 602 performs normal printing by controlling the printer engine 609 with respect to the input objects whose toner density has been reduced in step S1105. As a result, various problems, which are caused by the toner total amount exceeding the predetermined value, can be resolved.

On the other hand, if the CPU 602 determines in step S1102 that the input drawing object does not overlap with the transparent object (NO in step S1102), normal toner density adjustment processing is performed as follows.

First, in step S1106, the CPU 602 calculates the total amount of the CMYK colored toners. Then, in step S1107, the CPU 602 determines whether the total amount of the CMYK toners is greater than a predetermined value of the maximum toner total amount, which can be input by the processing of the image forming apparatus. If the CPU 602 determines that the toner total amount is equal to or less than the predetermined value (NO in step S1107), since the toner density is a toner total amount that can be processed by the image forming apparatus, the processing proceeds to step S1109. The CPU 602 then performs normal printing, and finishes the present processing.

On the other hand, if the CPU 602 determines, in step S1107, that the total amount of the CMYK toners exceeds the predetermined value (YES in step S1107), the processing proceeds to step S1108. Then, in step S1108, the CPU 602 reduces the CMYK respective channels in an equal ratio. In step S1109, the CPU 602 performs printing by controlling the printer engine 609, and finishes the present processing.

As a result, various problems caused by the toner total amount exceeding the predetermined value can be resolved without changing the color tone.

Figure 14A:
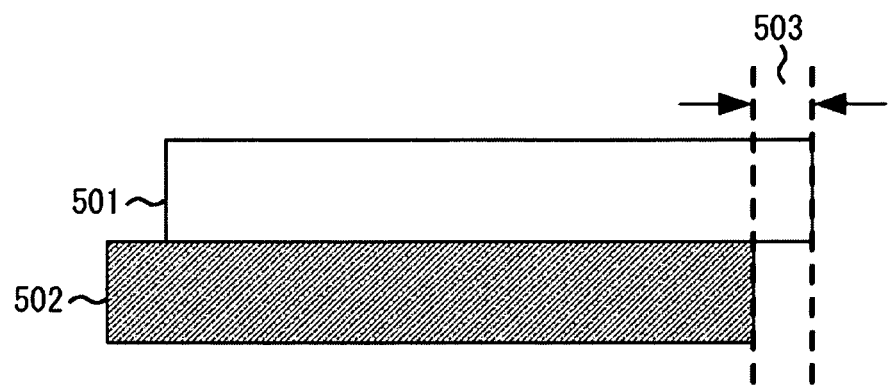
FIGS. 14A and 14B are diagrams illustrating color misregistration, which may occur when a non-transparent toner and a transparent toner are overlapped in an image forming apparatus.
Figure 14B:
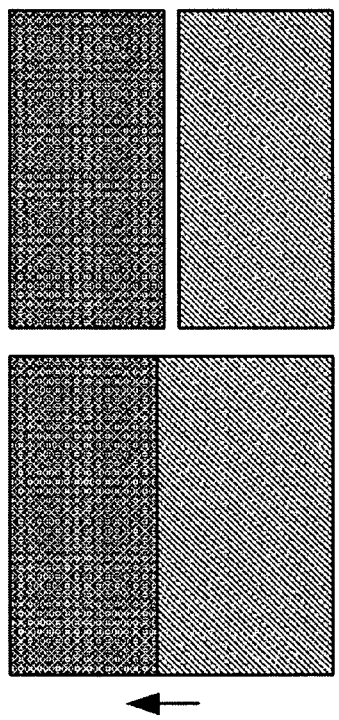

Conventionally, when printing by overlapping a transparent toner on a colored toner for the purpose of protecting the printing surface, as illustrated in FIGS. 14A and 14B, the expected protective effect cannot always be realized due to color misregistration.

Further, using a conventional trapping technique, color misregistration may not be prevented for the purpose of a protective effect. Below, an exemplary embodiment will be described which improves the expected protective effect against color misregistration.

Figure 7A:
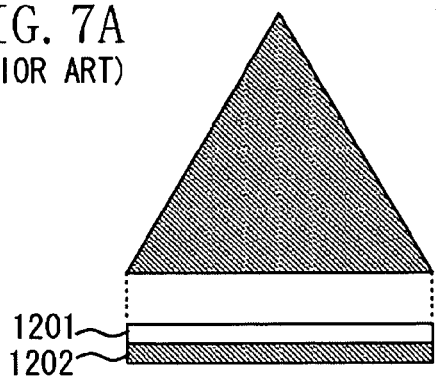
FIG. 7A is a schematic diagram illustrating the image formation processing state in a conventional image forming apparatus.
Figure 7B:
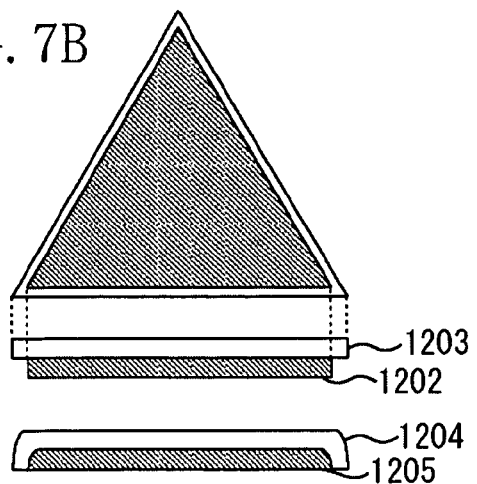
FIG. 7B is a schematic diagram illustrating the image formation processing state in an image forming apparatus illustrated in an exemplary embodiment of the present invention.

FIG. 7A is a schematic diagram illustrating the image formation processing state in a conventional image forming apparatus. FIG. 7B is a schematic diagram illustrating the image formation processing state in an image forming apparatus illustrated in an exemplary embodiment of the present invention. These are examples in which transparent toner TP is overlapped and fixed on non-transparent colored objects.

As illustrated in FIG. 7A, conventionally, a triangular colored object 1202 has been overlapped with a transparent object 1201 having exactly the same shape.

In contrast, in the present exemplary embodiment, as illustrated in FIG. 7B, the CPU 602 generates a transparent object 1203, which is larger than the colored object 1202 by just a predetermined width, and this transparent object 1203 overlaps the colored object 1202. If the CPU 602 controls the printer engine 609 with respect to the colored object 1202 and the transparent object 1203 to carry out fixing processing on a recording paper, the respective toners melt. As a result, an image is formed in which a large portion of a transparent object 1204 covers a colored object 1205 on the recording paper.

Figure 8:
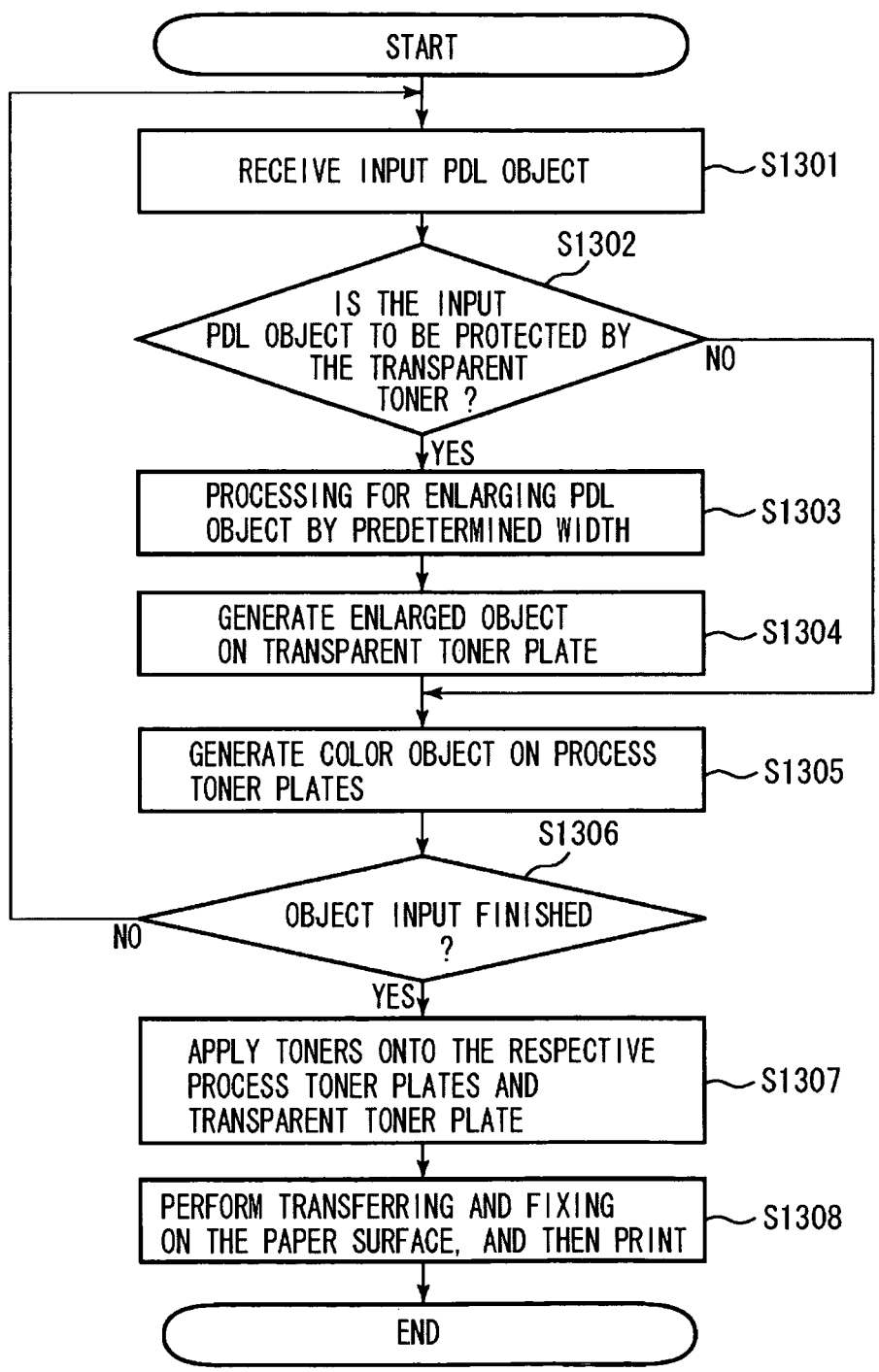
FIG. 8 is a flowchart illustrating an example of the data processing procedure illustrating the image formation processing state in the image forming apparatus according to the exemplary embodiments of the present invention.

FIG. 8 is a flowchart illustrating an example of a data processing procedure illustrating image formation processing state in the image forming apparatus according to the exemplary embodiments of the present invention. This example is a processing example, in which a transparent toner TP overlaps a non-transparent colored object, and then they are fixed. Each step is realized by the CPU 602 loading a control program, which is stored in the ROM 607, into the RAM 606 and executing the control program. Further, in the present exemplary embodiment, the CPU 602 receives printing information including a PDL object from the host computer 630 via the network interface 604, and stores the printing information in the RAM 606.

In step S1301, the CPU 602 inputs a PDL object in the RAM 606. Next, in step S1302, the CPU 602 determines whether the input PDL object is an object to be protected by the transparent toner. This is designated as an attribute in the PDL data via a printer driver of the host computer 630. Specifically, the CPU 602 determines whether the input PDL object is an object to be protected by the transparent toner, that is, whether an image region formed by the transparent toner overlaps an image region formed by the normal toner.

Here, if the CPU 602 determines that the input object is an object to be protected by the transparent toner (YES in step S1302), the processing proceeds to step S1303. Then, in step S1303, the CPU 602 performs processing on the RAM 606 to enlarge the PDL object of the input PDL data by a predetermined width.

Here, the enlarged width can be designated as an attribute to the PDL data via a user interface provided by the printer driver. Similarly, the enlarged width can be preset by a user via a user interface displayed on an operation panel 640 mounted on the image forming apparatus. Thus, in the present exemplary embodiment, if the CPU 602 determines, in step S1302, that the input PDL object is an object to be protected by the transparent toner (YES in step S1302), then in step S1303, the corresponding object is subjected to enlargement processing.

Next, in step S1304, the CPU 602 generates a transparent object on the transparent toner plate using the enlarged object.

In step S1305, like in a conventional image forming apparatus, the CPU 602 generates a color separated object on each of the separated color plates corresponding to the CMYK color toners respectively for the input object.

On the other hand, in step S1302, if the CPU 602 determines that the input PDL object is not an object to be protected by the transparent toner (NO in step S1302), steps S1303 and S1304 are skipped, and the processing proceeds directly to step S1305.

Then, in step S1306, the CPU 602 determines whether the input object is the last object to be input for that page. If the CPU 602 determines that the input object is not the last object (NO in step S1306), the processing returns to step S1301. The CPU 602, if receives a new input object, then continues the processing of steps S1302 to S1305.

On the other hand, if the CPU 602 determines in step S1306 that the input object is the last object (YES in step S1306), the processing proceeds to step S1307. In step S1307, the CPU 602 controls the printer engine 609 with respect to the CMYK process toner plates and the transparent toner plate generated in steps S1304 and S1305 so as to respectively apply each of the corresponding color toners and the transparent toner TP onto a recording paper surface.

In step S1308, the CPU 602 controls the printer engine 609 to perform printing by respectively transferring and fixing each of the corresponding color toners and the transparent toner TP applied on a photosensitive member of the printer engine 609 onto the paper surface, and then finishes the present processing.

By controlling in the manner described above, an advantageous effect can be obtained, in which a transparent toner having a protective effect can be precisely applied even in an image forming apparatus having a probability of color misregistration occurring.

In the present exemplary embodiment, processing, which applies a protection attribute for each object, has been described.

However, the processing does not have to be performed for each object. The effects of protection can be similarly obtained even if the existence of a protection attribute is set for all input objects.

Figure 9:
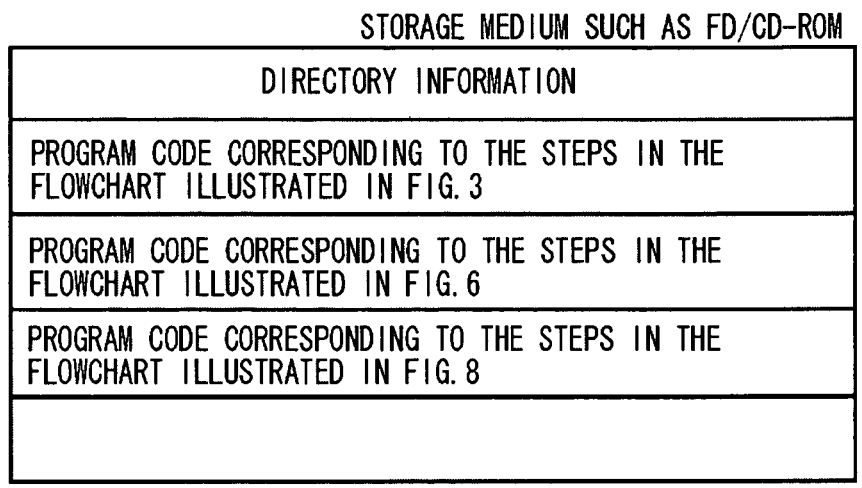
FIG. 9 is a diagram illustrating a memory map of a storage medium storing various data processing programs which can be read by the image forming apparatus according to an exemplary embodiment of the present invention.
Figure 10:
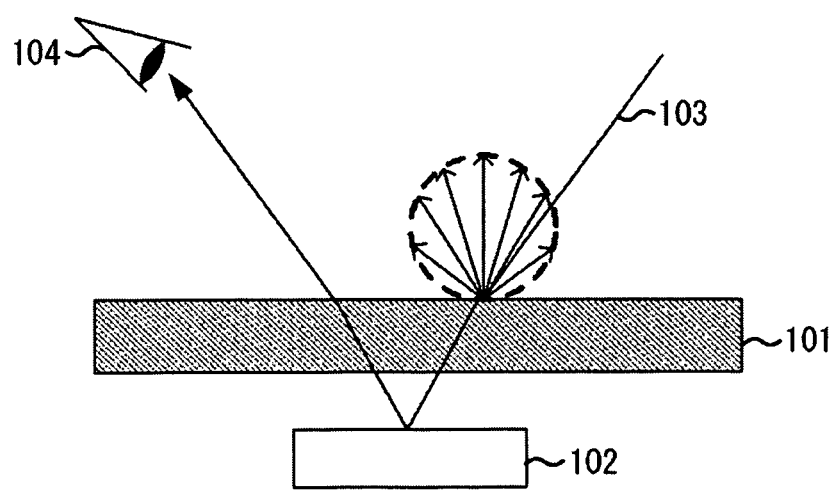
FIG. 10 is a schematic diagram illustrating a situation where an object is observed via a transparent substance.
Figure 11A:
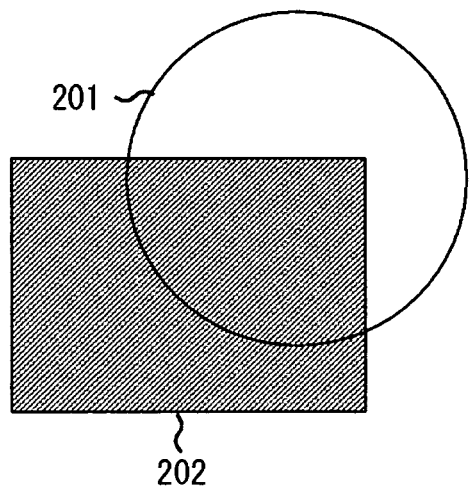
FIGS. 11A and 11B are schematic diagrams illustrating the image processing in a conventional image forming apparatus.
Figure 11B:
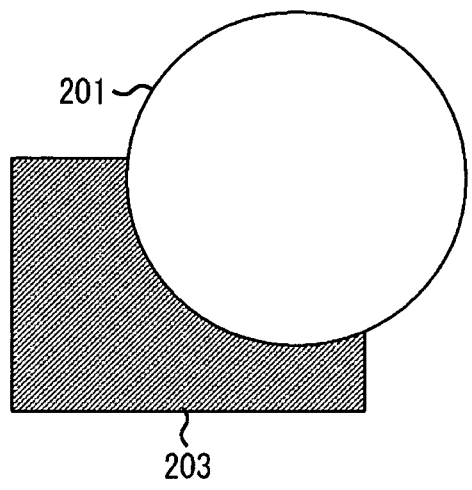
Figure 12:
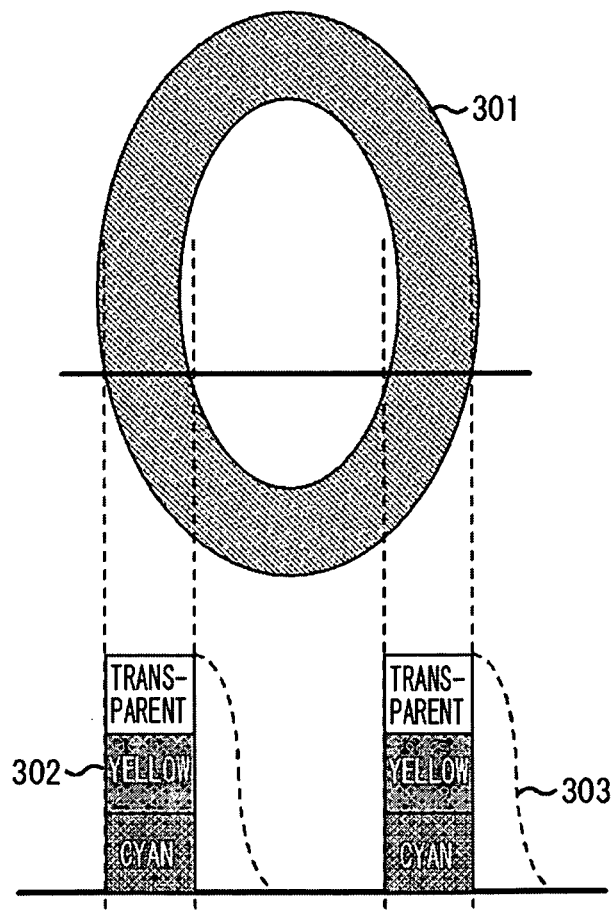
FIG. 12 is a schematic diagram illustrating the toner density adjustment processing in a conventional color image forming apparatus.
Figure 13:
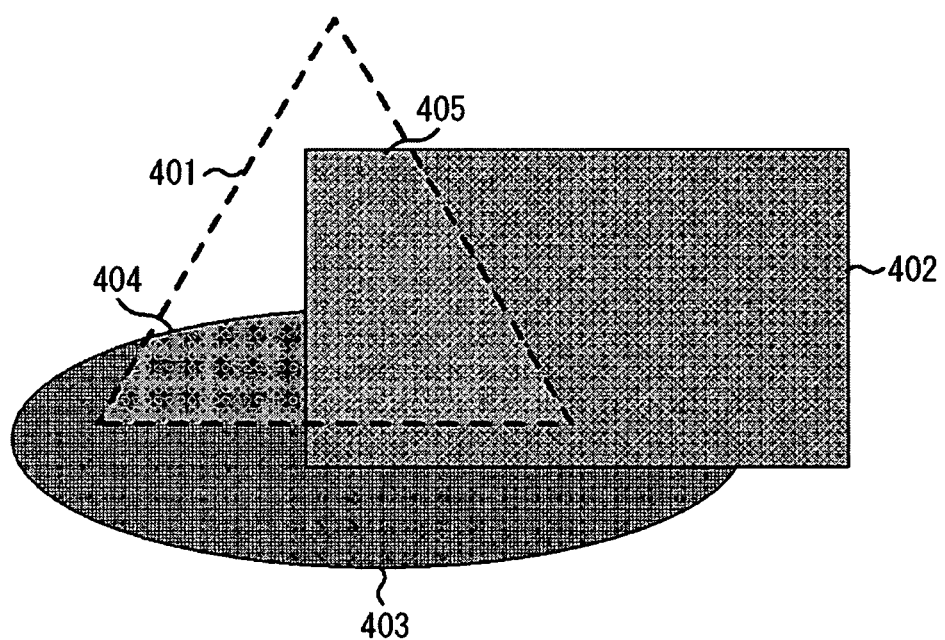
FIG. 13 is a schematic diagram illustrating printing results when a toner density adjustment is performed based only on the densities of the channels corresponding to the respective colors in the image forming apparatus.

FIG. 9 is a diagram illustrating a memory map of a storage medium storing various data processing programs, which can be read by the image forming apparatus, according to an exemplary embodiment of the present invention.

Although not illustrated, information for managing a group of programs stored in a storage medium, for example, version information and the creator, and information that depends on the operating system (OS) of the program reading side, for example, an icon identifying and displaying a program, can also be stored.

Further, data subordinate to various programs is also managed in the directory of the storage medium. In addition, programs for installing the various programs on a computer, and in the case where a program to be installed is compressed, programs for extracting can also be stored.

The functions illustrated in FIGS. 3, 6, and 8 can be performed by a host computer using a program which is externally installed. In that case, the present invention can still be applied in cases where information groups including a program are supplied to an output apparatus by a storage medium such as a compact disc read only memory (CD-ROM), a flash memory, or a floppy disk (FD), or from an external storage medium via a network.

Thus, a storage medium, on which the software program code for realizing the functions of the above exemplary embodiments is stored, is supplied to a system or an apparatus. Further, the present invention is achieved by having a computer (or a CPU or a micro processing unit (MPU)) of the system or apparatus read and execute the program code stored on the storage medium.

In this case, the program code itself read from the storage medium realizes the novel functions of the present invention, so that the storage medium that stores the program code constitutes another embodiment of the present invention.

Therefore, the type of the program is not limited so long as it has the function of a program, and can be object code, a program executed by an interpreter, script data supplied to the OS, and the like.

According to the present invention, a transparent object can be generated using a transparent toner based on the transparency attribute included in received printing information.

Further, the overall toner density, including the respective color toners and the transparent toner, can be suppressed when forming a color image using a transparent toner based on the transparency attribute included in received printing information.

In addition, the occurrence of color misregistration can be prevented when forming a color image using a transparent toner based on the transparency attribute included in received printing information.

Examples of storage media for supplying the program include a floppy disk, a hard disk, an optical disc, a magneto optical disk (MO), a CD-ROM, a compact disc recordable (CD-R), a CD-rewritable (CD-RW), a magnetic tape, a non-volatile memory, a ROM, a digital versatile disk (DVD) and the like.

In this case, the program code itself, which is read from the storage medium, implements the functions of the above exemplary embodiments, and thus the storage medium on which such program code is stored constitutes an embodiment of the present invention.

The method for supplying the program includes accessing a website on the Internet using the browsing function of a client computer, when the website allows each user to download the computer program according to the exemplary embodiments of the present invention, or compressed files of the programs having automatic installing functions, to a hard disk or other storage medium of the user. Furthermore, the program code constituting the programs according to the exemplary embodiments of the present invention can be divided into a plurality of files so that respective files are downloadable from different websites. Namely, the present invention encompasses World Wide Web (WWW) servers and File Transfer Protocol (FTP) servers that allow numerous users to download the program files so that their computers can realize the functions and processes according to the exemplary embodiments of the present invention.

Further, the program of the exemplary embodiments of the present invention can be encrypted, stored on a storage medium such as a CD-ROM, and distributed to a user. A user satisfying certain conditions is allowed to download key information for deciphering the encrypted information from a website via the Internet. By using that key information, the user can decipher the encrypted program, and can install the program on a computer to realize the functions of the exemplary embodiments.

Further, the present invention also includes embodiments where, for example, based on an instruction from that program code, the OS or the like running on the computer performs part or all of the actual processing, and by that processing the functions of the above-described exemplary embodiments are realized.

In addition, the present invention also includes cases where the program code read from a storage medium is written into a memory of a function expansion board inserted into the computer or a function expansion unit connected to the computer. Then, based on an instruction from the program code, a CPU or the like provided on the function expansion board or function expansion unit performs part or all of the actual processing. By that processing, the functions of the above-described exemplary embodiments are realized.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-030062 filed Feb. 12, 2008, which is hereby incorporated by reference herein in its entirety.

What is claimed is:

1. An image forming apparatus that forms a color image using a transparent toner and color toners based on received printing information, the image forming apparatus comprising:
   a first determination unit configured to determine whether a PDL transparency attribute is set for an object included in the printing information;
   a deciding unit configured to decide a transparent toner density based on a transmittance of the PDL transparency attribute, in the case where the PDL transparency attribute is determined to be set for the object;
   a second determination unit configured to determine whether or not a total toner amount based on the decided transparent toner density and a density of a color toner used for printing of the object for which the PDL transparent attribute is set satisfies a print condition;
   an adjustment unit configured to, in a case where the total toner amount has been determined not to satisfy the print condition, adjust the total toner amount so as to satisfy the print condition; and
   a printing unit configured to perform print processing of the object for which the PDL transparency attribute is set, based on the adjusted total toner amount.

2. The image forming apparatus according to claim 1, wherein the received printing information includes printing data based on a page description language and the transparency attribute.

3. The image forming apparatus according to claim 1, wherein the transparency attribute is set via a user interface of a driver, which generates the printing information.

4. A method for forming an image in an image forming apparatus that forms a color image using a transparent toner and color toners based on received printing information, the method performed using a programmed microprocessor, the method comprising:
   determining whether a PDL transparency attribute is set for an object included in the printing information;
   deciding a transparent toner density based on a transmittance of the PDL transparency attribute, in the case where the PDL transparency attribute is determined to be set for the object;
   determining whether or not a total toner amount based on the decided transparent toner density and a density of a color toner used for printing of the object for which the PDL transparent attribute is set satisfies a print condition;
   adjusting the total toner amount so as to satisfy the print condition in a case where the total toner amount has been determined not to satisfy the print condition; and
   performing print processing of the object for which the PDL transparency attribute is set, based on the adjusted total toner amount.

5. The method for forming an image according to claim 4, wherein the received printing information includes printing data based on a page description language and the transparency attribute.

6. The method for forming an image according to claim 4, wherein the transparency attribute is set via a user interface of a driver, which generates the printing information.

7. A non-transitory computer-readable storage medium configured to store a program for executing on a computer a method for forming an image in an image forming apparatus that forms a color image using a transparent toner and color toners based on received printing information, the method comprising:
   determining whether a PDL transparency attribute is set for an object included in the printing information;
   deciding a transparent toner density based on a transmittance of the transparency attribute, in the case where the PDL transparency attribute is determined to be set for the object;
   determining whether or not a total toner amount based on the decided transparent toner density and a density of a color toner used for printing of the object for which the PDL transparent attribute is set satisfies a print condition;
   adjusting the total toner amount so as to satisfy the print condition in a case where the total toner amount has been determined not to satisfy the print condition; and
   performing print processing of the object for which the PDL transparency attribute is set, based on the adjusted total toner amount.

8. The non-transitory computer-readable storage medium according to claim 7, wherein the received printing information includes printing data based on a page description language and the transparency attribute.

9. The non-transitory computer-readable storage medium according to claim 7, wherein the transparency attribute is set via a user interface of a driver, which generates the printing information.

* * * * *